United States Patent
Burneske et al.

(10) Patent No.: US 7,106,189 B2
(45) Date of Patent: Sep. 12, 2006

(54) TRACKING SYSTEM AND METHODS THEREOF

(75) Inventors: Gregory W. Burneske, Mankato, MN (US); Fred F. Schleifer, Prior Lake, MN (US)

(73) Assignee: TraceTech Incorporated, Mankato, MN (US)

( * ) Notice: Subject to any disclaimer, the term of this patent is extended or adjusted under 35 U.S.C. 154(b) by 133 days.

(21) Appl. No.: 10/835,187

(22) Filed: Apr. 29, 2004

(65) Prior Publication Data

US 2005/0242947 A1    Nov. 3, 2005

(51) Int. Cl.
G08B 1/08    (2006.01)

(52) U.S. Cl. ............................. 340/539.13; 340/539.1; 340/539.11; 340/539.22; 340/573.1; 340/573.4; 340/825.36; 340/825.49

(58) Field of Classification Search ........... 340/539.13, 340/539.1, 539.11, 539.14, 539.16, 539.22, 340/539.23, 572.1, 571.4, 825.49, 825.69, 340/825.72, 573.1, 573.4, 686.1, 825.36
See application file for complete search history.

(56) References Cited

U.S. PATENT DOCUMENTS

| | | | |
|---|---|---|---|
| 4,275,605 A | 6/1981 | Kennel | 74/5.34 |
| 4,290,316 A | 9/1981 | Noar et al. | 74/5.46 |
| 4,799,062 A | 1/1989 | Sanderford, Jr. et al. | 342/450 |
| 5,291,784 A | 3/1994 | Keyser | 73/516 |
| 5,309,529 A | 5/1994 | Gruber | 384/536 |
| 5,327,212 A | 7/1994 | Ficalora et al. | 356/350 |
| 5,383,363 A | 1/1995 | Kulmaczewski | 73/510 |
| 5,473,945 A | 12/1995 | Grieff et al. | 73/510 |
| 5,635,739 A | 6/1997 | Grieff et al. | 257/254 |
| 6,046,531 A | 4/2000 | Kikuchi et al. | 310/367 |
| 6,083,353 A * | 7/2000 | Alexander, Jr. | 202/158 |
| 6,192,756 B1 | 2/2001 | Kikuchi et al. | 73/504.12 |
| 6,198,394 B1 * | 3/2001 | Jacobsen et al. | 340/573.1 |
| 6,211,790 B1 * | 4/2001 | Radomsky et al. | 340/573.4 |
| 6,227,048 B1 | 5/2001 | Kikuchi et al. | 73/504.12 |
| 6,230,563 B1 | 5/2001 | Clark et al. | 73/504.04 |
| 6,344,794 B1 | 2/2002 | Ulrich et al. | 340/539 |
| 6,439,051 B1 | 8/2002 | Kikuchi et al. | 73/504.12 |
| 6,933,849 B1 * | 8/2005 | Sawyer | 340/572.4 |
| 2001/0001928 A1 | 5/2001 | Kikuchi et al. | 73/504.12 |
| 2003/0231098 A1 | 12/2003 | Wan | 338/32 |
| 2004/0021569 A1 | 2/2004 | Lepkofker et al. | 340/568.1 |

FOREIGN PATENT DOCUMENTS

WO    WO 02/056274 A1    7/2002

* cited by examiner

Primary Examiner—Hung Nguyen
(74) Attorney, Agent, or Firm—Medlen & Carroll, LLP

(57) ABSTRACT

The present invention relates generally to tracking systems and methods for monitoring the location of an asset or group of assets. In particular, the present invention provides systems for monitoring the location of a large group of assets. Furthermore, the present invention provides systems and methods for identifying an asset within a group of assets.

42 Claims, 7 Drawing Sheets

TRACKING SYSTEM AND METHODS THEREOF

FIELD OF THE INVENTION

The present invention relates generally to tracking systems and methods for monitoring the location of an asset or group of assets. In particular, the present invention provides systems for monitoring the location of each member of a large group of assets. Furthermore, the present invention provides systems and methods for uniquely identifying a single asset within a group of assets.

BACKGROUND OF THE INVENTION

A variety of methods and systems exist for tracking and locating assets and personnel in a facility such as a hospital or a factory. Present tracking methods currently available fall into several broad categories of operation: 1) control point; 2) time of arrival; and 3) GPS.

In control point schemes asset tracking tags are affixed to assets to be tracked. One such control point approach is presented in U.S. Pat. No. 6,344,794. Other control point methods are based on RFID technology similar to the system marketed by AXCESS Inc. The tracking tags can be either passive (e.g., deriving power from an external source) or active (e.g., deriving power from an internal source). The tracking tags emit a signal either upon request, periodically or sporadically. The signal can be a light signal, infra-red or RF signal and is modulated with an identification number unique to the asset to which the tracking tag is affixed.

Control point schemes require that a multitude of control points be established. Control points are usually established at doorways or in the geometric center of rooms of interest. At each control point a receiver, reader or access point is placed. The control points are typically tied together by a communications network which may include a central processor and database. When the tracking tag is in close proximity to a control point, the control point receives an identification number signal from the tracking tag.

There are several limitations to control point systems as they relate to asset tracking. The ability of the control point system to resolve the precise location of a tracking tag is limited. The control point system can only report that a given tracking tag is either within range or not within range of a given control point. In addition, there are large gaps in coverage between control points due to the propagation characteristics of IR and RF signal energy.

Time of arrival tracking systems determine the location of an asset by measuring the time it takes for radio signals to travel from multiple fixed radio antennas to the asset tracking tag. Conversely, a time of arrival system can be established by measuring the time it takes the signal to travel from the asset tracking tag to multiple fixed antennas. In some systems the multiple fixed antennas of time of arrival systems are installed specifically for the purpose of making time of arrival measurements. In still other systems time of arrival calculations are performed on signals emanating from antenna infrastructures that are already in place for other purposes such as wireless computer network access points or FM radio broadcast stations. One such time of arrival approach is presented in U.S. Pat. No. 4,799,062.

There are several limitations to time of arrival systems as they relate to asset tracking. The ability of time of arrival systems to resolve location requires an accurate time reference be available throughout the system. Each transmitter and receiver must be synchronized, either by direct or indirect means, to a known reference in order for time of arrival to be measured. Another set of limitations arises from the reflective nature of radio wave propagation. Multipath reflections can substantially increase the time of arrival for radio signals which will degrade the accuracy of any such system. Multipath reflections are especially problematic in an indoor environment. Another problem with time of arrival systems is that their accuracy is a function of the spatial diversity and number of time-of-arrival paths that can be determined. This limits the useful coverage area of a system to those areas where a transmitting tracking tag is within range of a minimum of three reference receivers. It would be desirable for an asset tracking tag to reliably report its position in the case where only one receiver was in communication range.

A well-known embodiment of a time of arrival system is the GPS satellite system. There are several limitations to the GPS system as it relates to asset tracking. The primary limitation is that GPS signals do not penetrate buildings and therefore assets in places such as hospitals and factories can not be located with GPS.

U.S. patent application Ser. No. 10/432,339 provides an asset tracking system utilizing inertial sensors. Accelerometers and gyroscopes are used to establish an inertial reference from which linear acceleration and roll rates are measured when the asset tracking tag is moved. A limitation with this tracking system is it provides no means of mitigating sensor errors inherent to all inertial sensor techniques such as noise, drift, error in calibration factors, and mechanical alignment errors.

What is needed is a tracking system that may be used indoors and outdoors. Additionally, what is needed is a tracking system that permits precise detection of an asset location.

SUMMARY OF THE INVENTION

The present invention relates generally to tracking systems and methods for monitoring the location of an asset or members of a group of assets. In particular, the present invention provides systems for monitoring the location of each member within a large group of assets. Furthermore, the present invention provides systems and methods for uniquely identifying an asset within a group of assets.

In certain embodiments, the present invention provides an asset tracking system. In preferred embodiments, the asset tracking system includes at least one tracking device, wherein each tracking device is associated with an asset, wherein each tracking device measures linear acceleration and roll rate, wherein each tracking device determines asset position, and wherein each tracking device detects and reduces measurement error. In other preferred embodiments, the asset tracking system includes a communication network configured to receive said asset position from each tracking device. In some preferred embodiments, the communication network participates in the detection and reduction of measurement error.

In some embodiments, the communication network displays the asset position. In certain embodiments, the asset is a non-living entity. In other embodiments, the asset is a living entity.

In some embodiments, each tracking device measures acceleration with at least one accelerometer. If the tracking device is associated with an asset that is allowed to rotate, each tracking device measures roll rate with at least one gyroscope.

In certain embodiments, the accelerometers measure linear acceleration. In certain embodiments, the gyroscopes measure roll rate.

In other preferred embodiments, each tracking device further comprises magnetic sensors, wherein the magnetic sensors identify the tracking device's heading error.

In other preferred embodiments, each tracking device further comprises a processor, wherein the processor receives accelerometer and gyroscope signals, uses those signals to calculate the tracking device's movement through space, detects errors in the accelerometer and gyroscope signals, and compensates for said measurement errors.

In other preferred embodiments, each tracking device processor performs minimal processing on the accelerometer and roll-rate signals, and the tracking device sends the accelerometer and roll-rate values to the communication network whereby computing elements in the network use the acceleration and roll-rate values to compute the tracking device's location.

In still further embodiments, the asset tracking system further includes a homing station, wherein the homing station provides a reference position for each tracking device. In some preferred embodiments, the asset position is in reference to the reference position.

In certain embodiments, the present invention provides a method of tracking an asset. In such embodiments, the method provides an asset tracking system. In further embodiments, the method entails acquiring the asset position for each asset.

In certain embodiments, the present invention provides an asset tracking system, comprising at least one tracking device associated with an asset, wherein the at least one tracking device measures acceleration and roll rate, identifies and mitigates measurement error, and determines asset position; and a communication network configured to receive the asset position from the at least one tracking device. In further embodiments, the communication network displays the asset position. In other embodiments, the asset is a non-living entity. In other embodiments, the asset is a living entity.

In further embodiments, the at least one tracking device measures acceleration with at least one accelerometer. In further embodiments, the accelerometer measures linear acceleration. In further embodiments, the at least one tracking device measures roll rate with at least one gyroscope. In further embodiments the gyroscope measures roll rate. In yet other embodiments, the measurement error is selected from the group consisting of: accelerometer measurement error, gyroscope measurement error, accelerometer linearity error, gyroscope linearity error, accelerometer noise, gyroscope noise, accelerometer drift, gyroscope drift, accelerometer misalignment, and gyroscope misalignment.

In other embodiments, the at least one tracking device further comprises a processor. In yet other embodiments, the processor performs calculations to determine the location of the at least one tracking device. In other embodiments, the processor identifies accelerometer measurement error. In further embodiments, the processor identifies gyroscope measurement error.

In other embodiments, the tracking device further comprises at least one magnetic sensor. In further embodiments, the at least one magnetic sensor measures the difference between the tracking device computational frame of reference and Earth's magnetic field. In yet other embodiments, the asset tracking system further comprises a homing station, wherein the homing station provides a homing station reference position for the at least one tracking device. In other embodiments, the asset position is in reference to the homing station reference position.

In certain embodiments, the present invention provides an asset tracking system, comprising at least one tracking device associated with an asset, wherein the at least one tracking device comprises at least one accelerometer, at least one gyroscope, and a processor, wherein the at least one accelerometer measures linear acceleration, wherein the at least one gyroscope measures roll rate, wherein the processor identifies and mitigates accelerometer measurement error and gyroscope measurement error, wherein the processor determines asset position; and a communication network configured to receive the asset position from the at least one tracking device, wherein the communication network displays the asset position.

In certain embodiments, the present invention provides a method of tracking an asset, comprising providing an asset tracking system comprising at least one tracking device associated with an asset, wherein the at least one tracking device measures acceleration, identifies and mitigates measurement error, and determines asset position; and a communication network configured to receive the asset position from the at least one tracking device; and acquiring the asset position for each asset.

In other embodiments, the communication network displays the asset position. In some embodiments, the asset is a non-living entity. In other embodiments, the asset is a living entity.

In some embodiments, the at least one accelerometer tracking device measures linear acceleration. In other embodiments, the at least one gyroscope measures roll rate. In other embodiments, the measurement error is inaccurate acceleration measurement. In further embodiments, the at least one tracking device further comprises at least one magnetic sensor, wherein the at least one magnetic sensor identifies alignment errors with the at least one accelerometer and the at least one gyroscope.

In further embodiments, the at least one tracking device further comprises a processor, wherein the processor identifies and mitigates the measurement error. In further embodiments, the method further comprising a homing station, wherein the homing station provides a homing station reference position for the at least one tracking device. In further embodiments, the asset position is in reference to the homing station reference position.

In certain embodiments, the present invention provides a method of tracking an asset, comprising providing a tracking device associated with an asset and an initial reference position, wherein the tracking device is configured to measure linear acceleration and roll rate, wherein the tracking device is configured to mitigate measurement error associated with the linear acceleration and roll rate measurements, wherein the tracking device is configured to determine the position of the asset; acquiring the linear acceleration and roll rate measurements; mitigating the measurement errors associated with the linear acceleration and roll rate measurements, and determining the position of the asset in relation to the initial reference position.

In further embodiments, the tracking device obtains the initial reference position from a homing station. In further embodiments, the tracking device further comprises at least one accelerometer and at least one gyroscope. In other embodiments, the tracking device measures the linear acceleration with at least one accelerometer. In further embodiments, the tracking device measures the roll rate with at least one gyroscope. In other embodiments, the tracking device further comprises at least one magnetic sensor, wherein the at least one magnetic sensor identifies alignment errors of the accelerometer and the gyroscope. In other embodiments, the asset is a non-living entity. In other embodiments, the asset is a living entity. In further embodiments, the mitigating the measurement errors involves adjusting the linear acceleration and roll rate measurements for accelerometer and gyroscope alignment error. In further embodiments, the mitigating the measurement errors involves filtering and digitally sampling the linear acceleration and roll rate measurements with initial calibration factors. In other embodiments, the mitigating the measurement errors involves resetting the initial reference position prior to taking the linear acceleration and roll rate measurement. In yet other embodiments, the determining the asset position involves processing the linear and roll rate measurements. In further embodiments, the processing involves integration calculations.

In certain embodiments, the present invention provides a method of tracking an asset, comprising providing an asset tracking system comprising at least one tracking device associated with an asset, wherein the at least one tracking device measures acceleration; and a communication network configured to receive measurements from the at least one tracking device, identify and mitigate measurement error, and determine asset position for the at least one tracking device; and acquiring the asset position for each asset. In preferred embodiments, the communication network displays the asset position. In further embodiments, the asset is a living or non-living entity.

In further embodiments, the at least one accelerometer tracking device measures linear acceleration. In further embodiments, the at least one gyroscope measures roll rate. In preferred embodiments, the measurement error is inaccurate acceleration measurement. In further embodiments, the at least one tracking device further comprises at least one magnetic sensor, wherein the at least one magnetic sensor identifies alignment errors with the at least one accelerometer and the at least one gyroscope.

In further embodiments, the at least one tracking device further comprises a processor, wherein the processor identifies and mitigates the measurement error. In even further embodiments, the method further comprises a homing station, wherein the homing station provides a homing station reference position for the at least one tracking device. In further embodiments, the asset position is in reference to the homing station reference position. In yet further embodiments, the communication network comprises a remote processor. In even further embodiments, the remote processor determines the asset position for the at least one tracking device.

DEFINITIONS

To facilitate understanding of the invention, a number of terms are defined below.

As used herein, the term "asset" refers to any living or nonliving entity.

As used herein, the term "tracking-device body axes" refers to a three-dimensional coordinate system defined by or fixed to the tracking device's enclosure.

As used herein, the terms "tracking-device computational frame," "computational frame of reference," "tracking device computational frame of reference," or similar terms, refer to a three-dimensional coordinate system for integrating the tracking device's location and attitude through time. Coordinates in the computational frame of reference are expressed, for example, as $x_C$, $y_C$, and $z_C$.

As used herein, the terms "user reference frame," "user coordinate system," or similar terms, refer to a user-defined three-dimensional coordinate system for measuring or displaying the tracking device's position. Coordinates in the user's frame of reference are expressed, for example, as $x_U$, $y_U$, and $z_U$.

As used herein, the term "heading and attitude" and "attitude" refers to a full description of the tracking device's orientation (not position) in three-dimensional space. This is equivalent to the net effect of roll, pitch, and yaw maneuvers over time.

As used herein, the term "homing field" refers to the localizing transmitter region.

As used herein, the term "localizing transmitter" refers to a device for sending a wireless signal that is received and used by a tracking device.

As used herein, the term "derived position coordinates" refers the tracking device's position coordinates as determined by the tracking device's sensors and internal processor, or as determined by a communication network server using sensor information provided by the tracking device via the communication network.

As used herein, the term "derived heading" refers the tracking device's heading as determined by the tracking device's sensors and internal processor, or as determined by a communication network server using sensor information provided by the tracking device via the communication network.

DETAILED DESCRIPTION

The present invention provides tracking systems and methods for monitoring the location of an asset or group of assets. In particular, the present invention provides systems for monitoring the location of each member of a large group of assets. Furthermore, the present invention provides systems and methods for uniquely identifying a particular asset within a group of assets. The illustrated and preferred embodiments discuss these systems and methods. These systems and methods are well suited for use with any type of asset tracking within any type of setting. FIGS. 1–7 show various preferred embodiments of the tracking device systems and methods of the present invention. The present invention is not limited to these particular embodiments.

Figure 1:
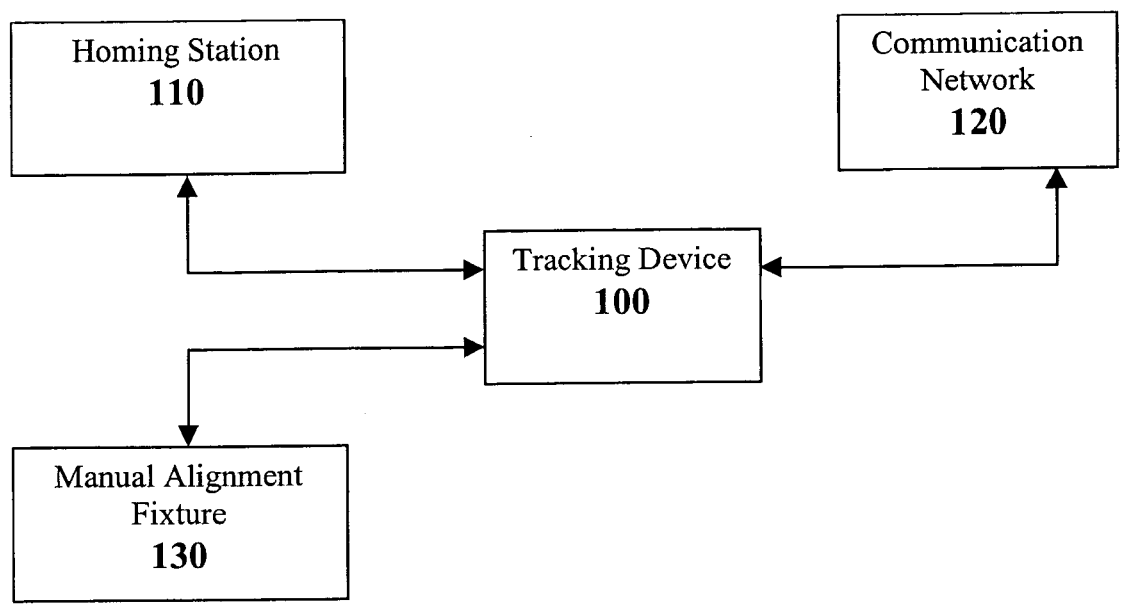
FIG. 1 presents a schematic of the asset tracking system.

FIG. 1 presents a schematic of the present invention, and includes a tracking device 100, a homing station 110, a communication network 120, and a manual alignment fixture 130. Generally, a tracking device 100 receives initial position coordinate information from a homing station 110 or a manual alignment fixture 130. As the tracking device 100 changes location within its computational frame, positional information is sent to the communication network 120. The communication network 120 is configured to present the location of a tracking device 100. For convenience, the description of the invention is presented in the following sections: I) Tracking Systems; and II) Uses of Tracking Systems.

I. Tracking Systems

The present invention provides tracking systems for the tracking of assets. As shown in FIG. 1, the tracking systems of the present invention include at least one tracking device 100, at least one homing station 110, communication network 120. In some embodiments, a manual alignment fixture 130 is further provided. Additionally, the tracking systems provide reliable and accurate asset information through detection and compensation of tracking device measurement error.

A. Tracking Device

Figure 2:
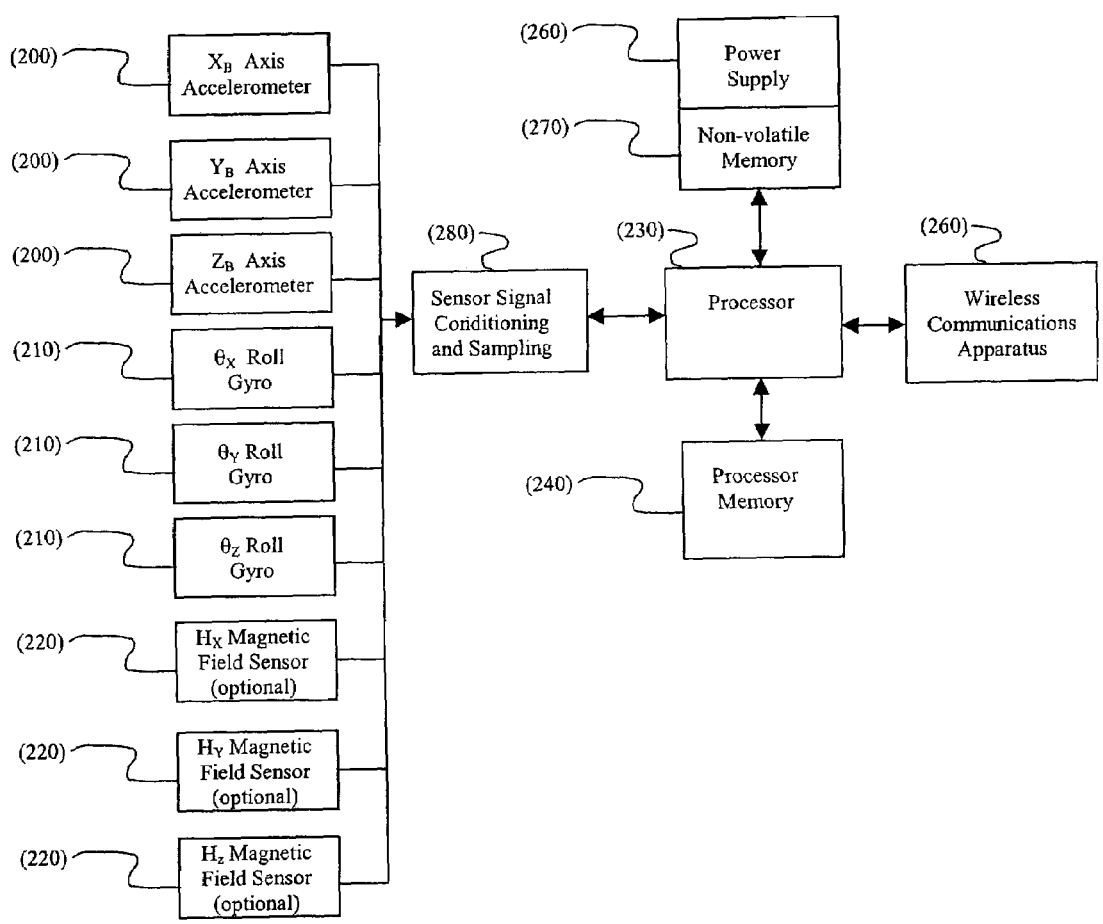
FIG. 2 presents a tracking device embodiment.

FIG. 2 presents a schematic depiction of an embodiment of a tracking device 100 of the present invention. Each tracking device 100 within the system associates with an asset (e.g., is affixed to the asset with screws, adhesive foam tape, etc.). The present invention is not limited to a particular kind of asset. In preferred embodiments, the asset includes living and non-living entities. The present invention is not limited to an asset of a particular size.

In preferred embodiments, a tracking device 100 of the present invention measures motion through measurement of linear acceleration and roll rates versus time. In further preferred embodiments, a tracking device 100 uses measured linear acceleration and roll rates to calculate position within the computational frame of reference. In even further embodiments, as a tracking device 100 changes location, the position coordinates are updated by, for example, adding calculated translation values from the integration and transformation of measured roll and acceleration.

Still referring to FIG. 2, the tracking device 100 comprises three accelerometers 200 positioned to measure linear acceleration. In preferred embodiments, the accelerometers 200 are positioned within the tracking device 100 to measure acceleration components along three substantially orthogonal axes (e.g., X, Y, and Z) within the tracking device body axes (see FIG. 3). The present invention is not limited to a particular type of accelerometer 200. In preferred embodiments, the accelerometer 200 is a linear accelerometer. The present invention is not limited to a particular type of linear accelerometer. Indeed, a variety of linear accelerometers find use in the present invention, including, but not limited to, the ADXL150 and ADXL250 (Analog Devices), and the MMA1250D and VTI-SCA320-CC5V1G (Motorola). In other embodiments, the present invention utilizes linear accelerometers described in U.S. Pat. Nos. 5,291,784; 5,383,363; 5,408,879; 5,473,945; 5,635,739; 6,046,531; 6,192,756; each herein incorporated by reference in their entirety. In preferred embodiments, the ADXL210EB (Analog Devices) linear accelerometer is used.

It is recognized that a single accelerometer device may provide measurements along more than one axis. It is also recognized that more than three accelerometers may be employed to redundantly measure acceleration for the benefit of reducing measurement error (e.g., noise) or improving accuracy. For the purposes of describing the nature of this invention, a single accelerometer is assigned to each orthogonal body axis with the task of measuring acceleration along that particular axis.

Still referring to FIG. 2, the tracking device 100 comprises three gyroscopes 210 positioned to measure roll rate about three axes. In preferred embodiments, the gyroscopes 210 are positioned in a tracking device 100 to measure the rotation or roll rate around three substantially orthogonal axes (e.g., X, Y, and Z) within the tracking device's body-axes coordinate system (see FIG. 3). The gyroscopes 210 have fixed positions within the tracking device 100 enclosure, and the gyroscope measurements are in the tracking device's body-axes coordinate system. The present invention is not limited to a particular type of gyroscope 210. In some embodiments, the present invention utilizes gyroscopes 210 described in U.S. Pat. Nos.: 4,275,605; 4,290,316; 5,309,529; 5,327,212; 6,227,048, 6,230,563, 6,439,051; and U.S. Patent Application No. US20010001928A1; each herein incorporated by reference in their entirety. In preferred embodiments, the ADXRS300 (Analog Devices) is used. The tracking device 100 is not limited to a particular positioning of the gyroscopes 210.

It is recognized that a single gyroscope device may provide measurement outputs for more than one axis of rotation. Furthermore, it is recognized that more than three gyroscopes may be employed to provide redundant roll-rate measurements in order to reduce measurement noise or to improve the accuracy of the system. It is also recognized that a gyroscope may provide various types of measurement information (e.g., absolute angular change, roll rate).

Still referring to FIG. 2, the tracking device 100 comprises at least one magnetic field sensor 220. The present invention is not limited to a particular type of magnetic field sensor 220. In preferred embodiments, the magnetic field sensor 220 is an arrangement of 3 single-axis magnetic field sensors. In some embodiments, the present invention provides a 2-axis magnetic field sensor as provided in U.S. patent application Ser. No. US20030231098A1; herein incorporated by reference in its entirety. In preferred embodiments, the HMC1002 (Honeywell) 2-axis magnetic sensor, the HMC1053 (Honeywell) 3-axis magnetic sensor, or multiple HMC1001 single axis sensors are used. The magnetic field sensor 220 measures the earth's magnetic-field vector (e.g., the X-axis, Y-axis and Z-axis components) in the tracking device's body-axes coordinate system. The present invention is not limited in the number of magnetic field sensors 220. In other preferred embodiments, the homing station 110 provides a magnetic field with a particular directional vector that can be detected by the tracking device. In some embodiments, the tracking device 100 uses the magnetic field measurements to realign its computational frame as discussed below. In some preferred embodiments, the homing station 110 modulates the magnetic field so that the tracking device can distinguish the homing station's magnetic field from the Earth's static magnetic field.

Still referring to FIG. 2, the tracking device 100 comprises signal conditioning and sampling circuitry 280. In preferred embodiments, the signal conditioning and sampling circuitry 280 permits measurement error filtering (e.g., anti-aliasing filtering, noise removal). In preferred embodiments, the signal conditioning and sampling circuitry 280 provide measurements of the sensor signals. In preferred embodiments, the signal conditioning and sampling circuitry 280 converts the sensor signals (e.g., accelerometer measurements, gyroscope measurements) into a processor 230 suitable format. In some embodiments, the signal conditioning and sampling circuitry 280 is external to the processor 230. In other embodiments, the signal conditioning and sampling circuitry 280 is integrated with the processor 230. It is understood that some types of sensors (e.g., accelerometers, gyroscopes) generate measurement data directly compatible with a processor 230.

Still referring to FIG. 2, the tracking device 100 provides a data processing element. The present invention is not limited to a particular kind of data processing element. In preferred embodiments, the data processing element is a processor 230. The present invention is not limited to a particular type of processor 230. In preferred embodiments, the processor 230 comprises a memory 240 for storing information (e.g., position coordinates, acceleration measurements). In other preferred embodiments, the processor 230 externally interfaces with a memory 240. In some embodiments, the tracking device 100 further comprises a non-volatile memory 270. The present invention is not limited to a particular type of non-volatile memory 270. In preferred embodiments, the non-volatile memory 270 is used for storing persistent data (e.g., the tracking device's unique ID number, sensor calibration factors).

In preferred embodiments, the processor receives information through wireless communication. The present invention is not limited to a particular type of wireless communication. In preferred embodiments, the present invention utilizes 802.11 WiFi. The processor 230 receives information from any device or thing capable of distributing information through wireless communication (e.g., a homing station, a network station, a cellular telephone, a PDA, a satellite, a laptop computer).

In preferred embodiments, the processor 230 receives information from the homing station 110. The processor 230 is not limited in the type of information it receives from the homing station 110. In preferred embodiments, the homing station 110 provides home position coordinates to the processor 230. In other preferred embodiments, the homing station 110 provides a magnetic field that that can be detected by magnetic sensors 220 in the tracking device to mitigate errors that have accumulated in the tracking device derived heading. In other preferred embodiments, the homing station 110 provides an identification number for the tracking device 100. The processor 230 stores information received from the homing station 110 in the memory 240.

Referring to FIG. 2, the tracking device 100 comprises a power supply 250. The present invention is not limited to a particular type of power supply 250 (e.g., battery, light generated). In preferred embodiments, the power supply 250 is a battery. In further preferred embodiments, the power supply 250 provides sufficient energy to run all of the elements of the tracking device 100. The power supply 250 is not limited to a particular life span.

The tracking systems of the present invention detect the location of an asset. The tracking systems are not limited to a particular method of asset detection. In preferred embodiments, the tracking device 100 detects asset location. In further preferred embodiments, asset location is detected through measurement of position and attitude changes over time within the tracking device computational frame of reference. The tracking device 100 is not limited to a particular method for measuring location changes within a tracking device's computational frame of reference. In preferred embodiments, the processor 230 computes location changes (e.g., position changes, heading and attitude changes) within a tracking device computational frame of reference (e.g., quaternion processing, matrix transformations, integration).

In preferred embodiments, the computation frame of reference is an inertial frame (e.g., the computational reference-frame does not intentionally rotate over time). A computational reference frame within an inertial frame permits straightforward integration of transformed acceleration and roll-rate vectors.

Establishment of a transformational matrix allows transformation from the tracking device computational frame of reference to the user frame of reference. In preferred embodiments, a transformational matrix is established between the tracking device computational frame of reference and the user frame of reference.

The transformational matrix between the tracking device computational frame of reference and the user frame of reference accounts for the rotation of the Earth over time. In some embodiments, the user coordinate frame of reference is fixed to a stable structure (e.g., a building) and rotates with the Earth. In other embodiments, the computational frame of reference rotates with the Earth. In yet other embodiments, the present invention provides methods of compensating for the Earth's rotation. The gyroscopes 210 measure changes in the tracking device 100 roll, pitch and yaw by measuring roll rates around each of the axes within the tracking device's body axes as an asset changes location.

Figure 3:
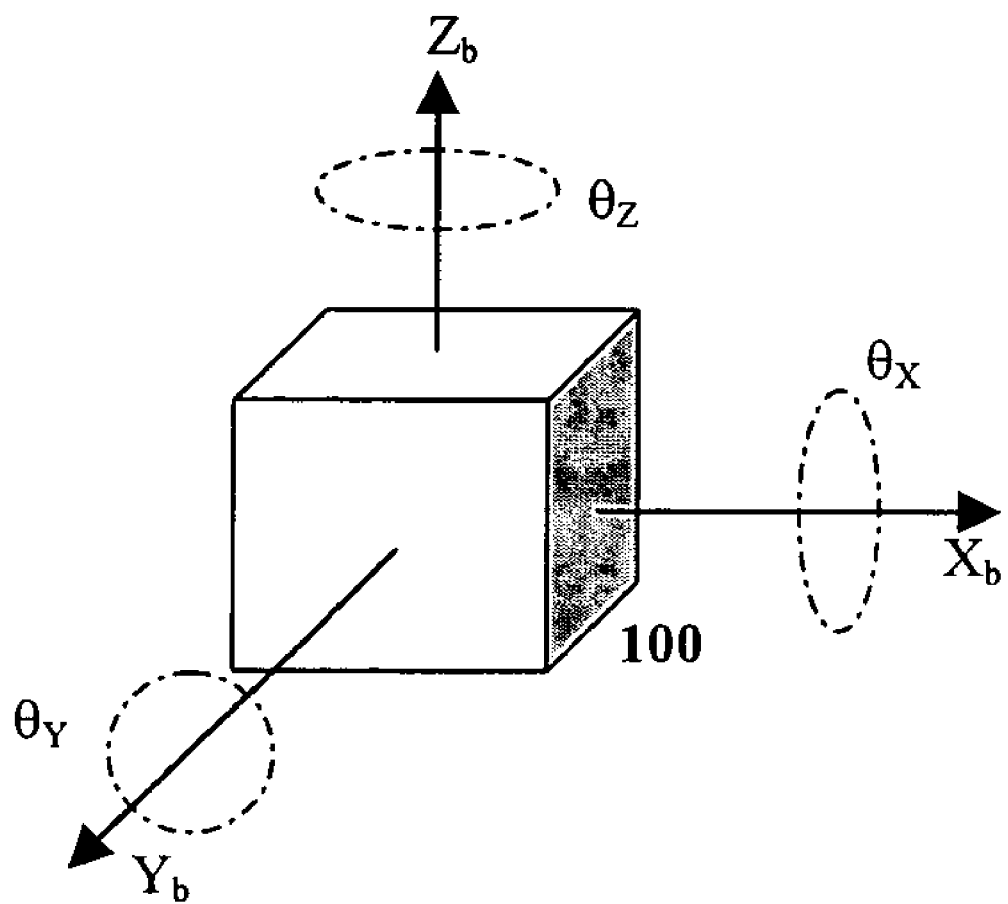
FIG. 3 presents a schematic example of a tracking device's body-axes coordinate system.

Referring to FIGS. 2 and 3, roll is described by $\theta x$, pitch is described by $\theta y$, and yaw is described by $\theta z$. In preferred embodiments, one gyroscope 210 is assigned to each axis of the body-axes coordinate system. The present invention is not limited to a particular frequency of roll rate measurements by signal condition and sampling circuitry 280. In preferred embodiments, signal condition and sampling circuitry 280 provides the processor 230 with gyroscope roll-rate measurements at a sample rate sufficient to accurately capture the motion of the asset.

In preferred embodiments, processor 230 employs quaternion mathematics to transform and integrate the tracking device body-axes gyroscope measurements into a representation of the tracking device 100 attitude in the computational frame of reference. A quaternion is an extension of complex number. A complex number is typically expressed as $x=a+ib$, where a is the real component and ib is the imaginary component. A quaternion may be expressed as $x=a+ib+jc+kd$, where i, j, and k provide three orthogonal imaginary components and a is the real component. Similarly to how a complex number may represent an angle on the complex plane, a quaternion can represent an attitude in three-dimensional space. Multiplying complex numbers is equivalent to adding their angular representations on the complex plane. Quaternions can similarly accumulate changes in attitude over time through sequential multiplication of incremental roll quaternions derived from the gyroscope signals. Quaternions have rules of arithmetic similar to complex numbers except that the multiplication operation is not commutative. Indeed, interchanging the order of a roll and a pitch maneuver results in a different final attitude of an object.

The three accelerometers 200 measure linear acceleration within the tracking device's body-axes frame of reference as an asset changes location. In preferred embodiments, one accelerometer 200 is assigned to each axis (e.g., $X_B$, $Y_B$, and $Z_B$) in the body-axes coordinate system. The present invention is not limited to a particular frequency of linear acceleration measurements by signal conditioning and sampling circuitry 280. In preferred embodiments, signal conditioning and sampling circuitry 280 provides the processor 230 with measurements at a sufficient sample rate to accurately capture the motion of the asset.

In preferred embodiments, processor 230 transforms (rotates) the body-axes accelerometer measurements into the tracking device computational frame of reference. In preferred embodiments, this transformation is based on the current attitude of the tracking device 100 as represented by an attitude quaternion.

Since the tracking system of this invention operates within or around a stable structure on the surface of the Earth, the tracking system operates within the gravity field of the Earth. Accelerometers 200 register the constant, 1g pull of gravity, even when the tracking device is stationary. Indeed, double integration of this measured gravitational acceleration generates large position errors. The present invention provides gravity compensation methods. In preferred embodiments, the processor 230 subtracts the 1g gravity vector from the rotated accelerometer measurements in the tracking device computational frame of reference. In further embodiments, the processor 230 doubly integrates the acceleration component along each axis of the tracking device computational frame of reference to update the asset position stored in memory 240. In some embodiments, the processor 230 calculates the X-axis linear translation, in the tracking device computational frame of reference, through application of the following equation:

$$x(t) = x_0 + \int_0^t \int_0^t a x \cdot d^2 t,$$

where $x(t)$ is linear translation in the direction of x, ax is the previously rotated and gravity-subtracted linear acceleration in the computational frame's x direction, $x_0$ is the initial x position, and t is time. In some embodiments, the processor 230 also calculates the Y and Z translations using the same equation with y- and z-axis input values and y- and z-axis results substituted respectively. It is understood that the equation shown here represents a continuous-time double integration for explanatory purposes. For preferred embodiments, which work with discrete time samples of the transformed accelerometer measurements, this equation is translated to an equivalent discrete-time double integration for each computational axis.

Figure 4:
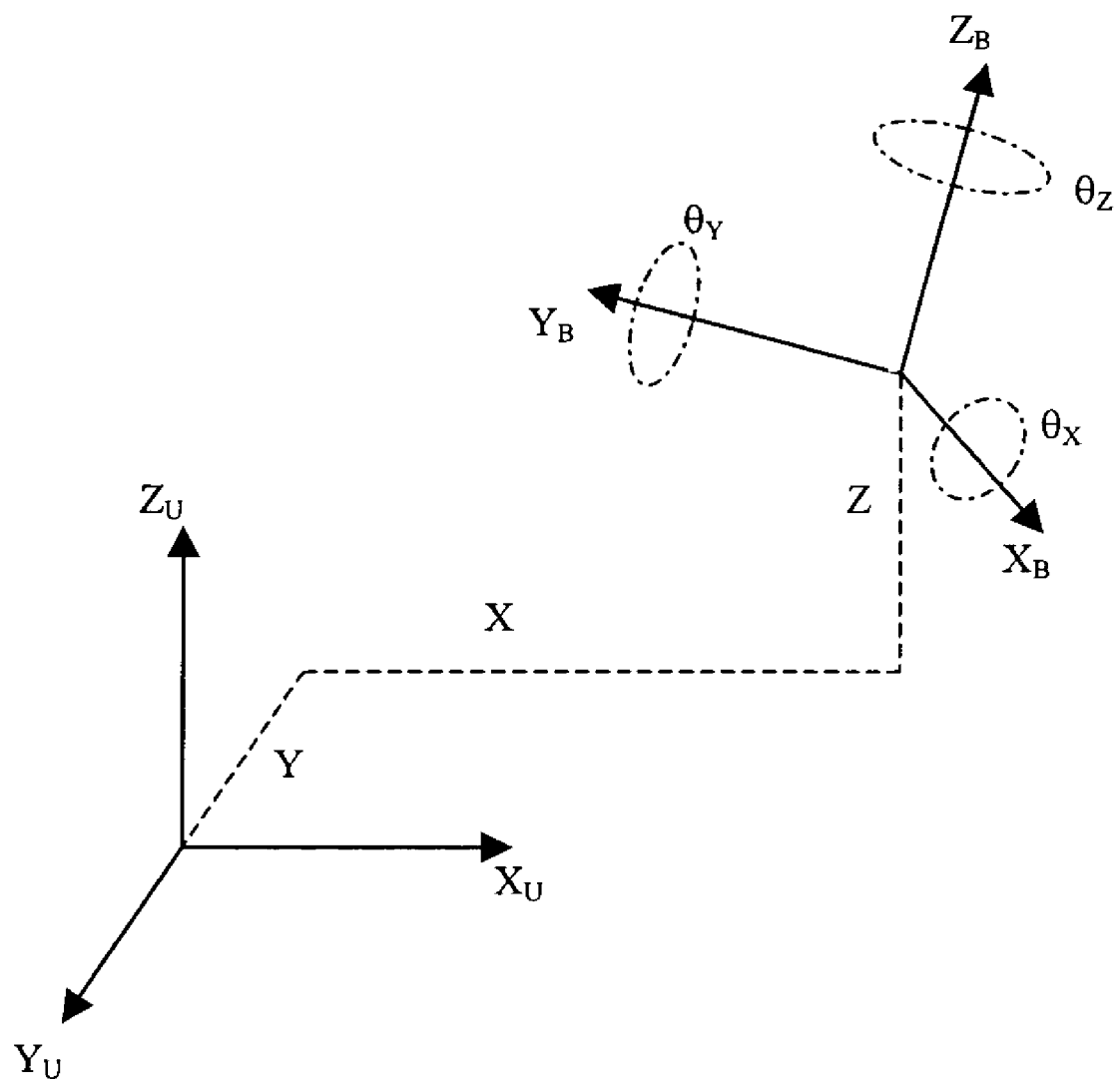
FIG. 4 presents a depiction of the tracking device's body axes and the user's frame of reference.

In further embodiments, asset rolling motion is not prohibited. FIG. 3 shows the asset local frame of reference and coordinate system. FIG. 4 shows the physical relationship between the body-axes frame of reference and the user frame of reference after the asset is subjected to rolling and translational motion over time. Indeed, if over a fixed time interval, the amount of translation and roll is known, the asset's new position in the original frame of reference at the end of the time interval is calculated.

In preferred embodiments, the processor 230 transforms a position vector from the computational frame of reference frame into a user coordinate system. The present invention is not limited to a particular type of transformation. In preferred embodiments, the processor 230 performs a transformation by multiplying an augmented computational position vector with a transformation matrix. In such embodiments, a value of unity is appended to the three-element computational-frame of reference vector to create an augmented four-element vector. In further embodiments, the overall transformation equation is $$\begin{bmatrix} x_U \\ y_U \\ z_U \end{bmatrix} = M_{UC} \cdot \begin{bmatrix} x_C \\ y_C \\ z_C \\ 1 \end{bmatrix} = \begin{bmatrix} c_{11} & c_{12} & c_{13} & x_{OFF} \\ c_{21} & c_{22} & c_{23} & y_{OFF} \\ c_{31} & c_{32} & c_{33} & z_{OFF} \end{bmatrix} \cdot \begin{bmatrix} x_C \\ y_C \\ z_C \\ 1 \end{bmatrix}$$

where $M_{UC}$ is the 3×4 computational-to-user transformation matrix, $(x_C \ y_C \ z_C)^T$ is the input position vector in computational-frame coordinates, and $(x_U \ y_U \ z_U)^T$ is the output position vector in user coordinates. As illustrated in the equation, matrix $M_{UC}$, in preferred embodiments, may be further broken down into a linear-translation vector $(x_{OFF} \ y_{OFF} \ z_{OFF})^T$ and a rotation matrix (e.g., an orthonormal cosine matrix) consisting of nine $c_{MN}$ elements. In some embodiments, the processor 230 periodically updates $M_{UC}$ to maintain tracking system accuracy. In preferred embodiments, such updates occur at various intervals (e.g., upon use of the manual alignment fixture; upon contact with a homing station; periodically to account for the Earth's rotation).

The tracking systems track asset position through three spatial dimensions. In some embodiments, the tracking systems permit fewer degrees of freedom of motion. These restrictions of motion may apply to linear motion, rotational motion, or both. In some embodiments, movement of the tag is restricted such that rolling motion around any axis is prohibited. In such a roll-limited system, the coordinate axes of the tracking device body axes, computational frame, and user coordinate system all remain parallel to each other. As such, double integration of the linear accelerometers over time yields translation over time. An iterative algorithm performing integration and summation allows the tracking device 100 to continually derive the present position coordinates $x_U$, $y_U$, and $z_U$.

B. Homing Station

Figure 5:
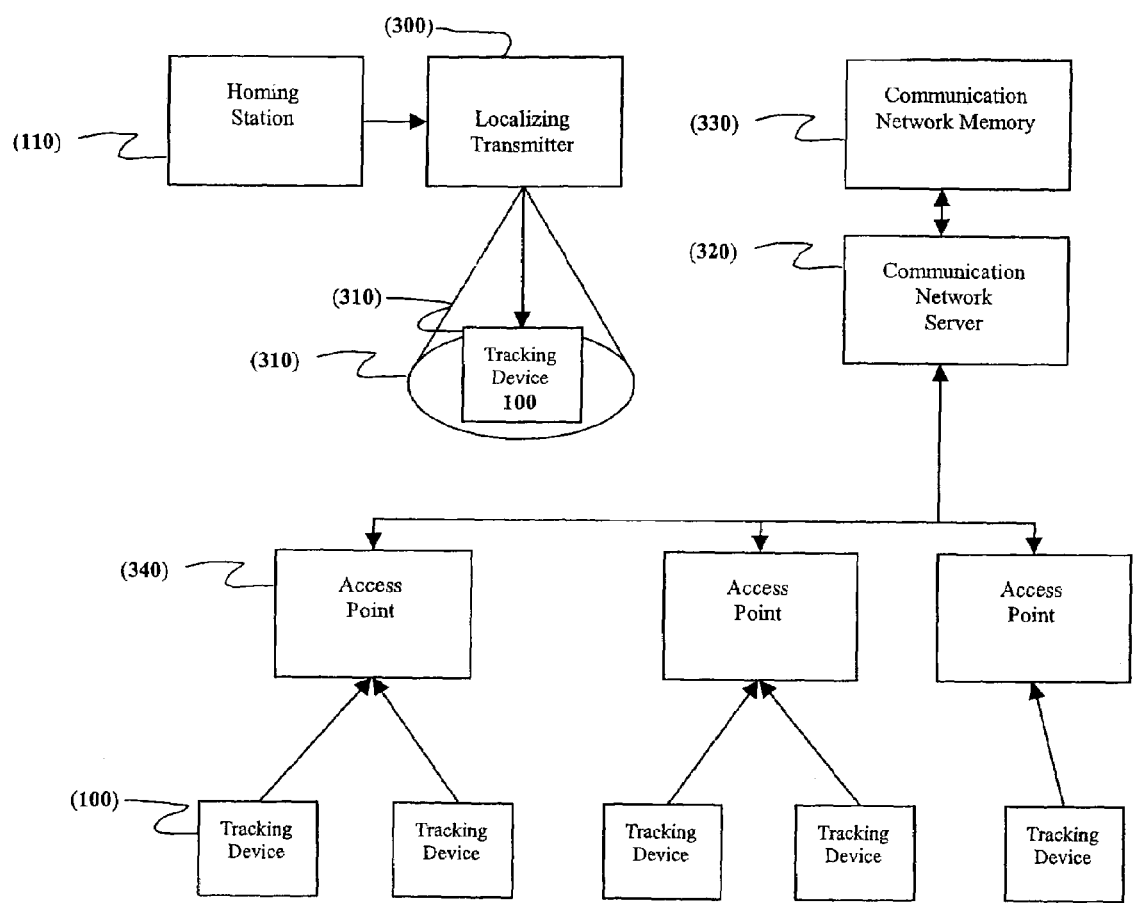
FIG. 5 presents a schematic depiction of a homing station and communication network embodiments.

FIG. 5 presents a schematic depiction of an embodiment of a homing station 110 of the present invention. The present invention includes a homing station 110 for use in the tracking of assets. The present invention is not limited to a particular type of homing station 110. The present invention is not limited to a particular number of homing stations 110. In preferred embodiments, one homing station 110 is provided.

Each homing station 110 distributes information to the tracking device 100. Each homing station 110 is not limited to the type of information it distributes to the tracking device 100. In preferred embodiments, homing station 110 distributes user-reference-frame information to the tracking device 100. In some embodiments, homing station 110 receives information from tracking device 100. In further preferred embodiments, the tracking device 100 receives information from the homing station 110 while passing through a homing field 310.

For each homing station 110, a localizing transmitter 300 generates homing field 310. The localizing transmitter 300 is not limited to a particular type of homing field 310. In preferred embodiments, the homing field 310 is the region in which the localizing transmitter 300 is capable of distributing information to the tracking device. The homing field 310 is not limited to a particular size or dimension.

Each homing station 110 provides a reference for the user coordinate system. A homing station 110 is not limited to a particular method for providing the user coordinate system reference.

In preferred embodiments, each homing station 110 provides the tracking device 100 with home position coordinates relative to the user reference frame when the tracking device is within range of the homing field 310.

In some embodiments, each homing station 110 is configured to distribute information through communication network 120. A homing station 110 is not limited to a particular method of information distribution. In preferred embodiments, a homing station 110 distributes information through wireless communication or a wired local area network. In further preferred embodiments, a homing station 110 utilizes 802.11 WiFi for wireless communication. A homing station 110 is not limited to a particular frequency of information distribution (e.g., per second; per minute; per hour; per day).

The localizing transmitter 300 initializes a tracking device 100 on a communications network 120. The localizing transmitter 300 is not limited to a particular method of initializing a tracking device 100 as a communications network 120. In preferred embodiments, the localizing transmitter 300 initializes the tracking device 100 on a communications network 120 by programming the tracking device 100 with a unique identification number and the home position coordinates. In other embodiments, the tracking device 100 has a fixed identification number, which the homing station reads and associates with an asset.

In some preferred embodiments, the localizing transmitter 300 provides a magnetic field for a particular direction that is sensed by magnetic sensors 220 within the tracking device 100 to allow the tracking device 100 to reset its heading and attitude. In some preferred embodiments, the homing station 110 magnetic field is modulated so that the tracking device 100 distinguishes it from the Earth's static magnetic field.

C. Communication Network

FIG. 5 presents a schematic depiction of an embodiment of a communication network 120 of the present invention. The present invention includes a communication network 120 for use in the tracking of assets. The present invention is not limited to a particular type of communication network 120. The present invention is not limited to a particular number of communication networks 120. In preferred embodiments, one communication network 120 is provided.

The communication network 120 provides a communication network server 320. The communication network 120 is not limited to a particular type of communication network server 320. In preferred embodiments, the communication network server 320 is a computer. In other preferred embodiments, the communication network server 320 is part of a plurality of computers. The communication network 120 is not limited to a particular number of communication network servers 320. In preferred embodiments, one communication network server 320 is provided.

The communication network server 320 is configured to store information (e.g., tracking device locations, computation-to-user transformation matrices, etc.). The communication network server 320 is not limited to a particular method of storing information. In preferred embodiments, the communication network server 320 stores information with a communication network server memory 330. The communication network server memory 330 is not limited to a particular size.

The communication network server 320 is configured to present information. The communication network server 320 is not limited to a particular manner of information presentation. In preferred embodiments, the communication network server 320 presents information in a visual medium (e.g., computer monitor). In other embodiments, the communication network server 320 presents information in a text based medium (e.g., email messages).

The communication network server 320 is configured to obtain information. The communication network server 320 is not limited to a particular manner or frequency of obtaining information (e.g., per second, per minute, per hour, per day, per request). In preferred embodiments, the communication network server 320 obtains information at the request of a user. The communication network server 320 is not limited to a particular method of obtaining information. In preferred embodiments, the communication network server 320 obtains information through wireless communication. The communication network server 320 is not limited to a particular type of wireless communication (e.g., Bluetooth, 802.11 WiFi). In preferred embodiments, the communication network server 320 utilizes 802.11 WiFi wireless communication. The communication network server 320 is configured to receive information from wireless communication sources (e.g., satellites, cellular telephones, computers). In preferred embodiments, the communication network server 320 receives information from access points 340.

The communication network 120 provides access points 340. In preferred embodiments, the access points 340 receive and distribute information. The access points 340 are not limited to a particular method of receiving and distributing information. In preferred embodiments, the access points 340 receive and distribute information through wireless communication. The access points 340 are not limited to a particular form of wireless communication (e.g., Bluetooth, 802.11 WiFi). In preferred embodiments, the access points 340 utilizes 801.22 WiFi wireless communication. The communication network 120 is not limited to a particular number of access points 340. In preferred embodiments, the communication network 120 provides at least one access point 340. The access points 340 are configured to receive information from wireless communication sources (e.g., satellites, cellular telephones, computers). In preferred embodiments, the access points 340 receive information from tracking devices 100. In particularly preferred embodiments, the access points 340 receive information (e.g., tracking device locations) from tracking devices and distribute such information to the communication network server 320. In other preferred embodiments, access points 340 additionally exchange information with homing stations 110 and transfer this information to and from communication network server 320.

D. Methods of Tracking System Error Reduction

Inertial sensor (e.g., accelerometer, gyroscope) measurements are often confounded with measurement error. Referring to FIG. 2, the tracking device 100 is configured to identify and reduce tracking device measurement error (e.g., accelerometer measurement errors, gyroscope measurement errors, sensor noise, calibration factor errors, sensor errors, mechanical alignment errors, etc.). Referring to FIG. 5, the communication network server 320 is configured to compensate for tracking device 100 measurement error (e.g., sensor noise, sensor gain errors, sensor linearity errors, error in calibration factors, mechanical alignment errors). Measurement error results in erroneous sensor output. Integration of erroneous accelerometer 200 and/or gyroscope 210 measurements results in positional error that accumulates over time. The tracking device 100 is configured to compensate for sensor measurement error. The tracking device 100 is not limited to a particular method of compensating measurement error (e.g., manufacturing calibration of each tracking device's sensors, periodic contact with a homing station, compensation for the Earth's rotation, periodic alignment of one axis of the computational frame to the gravity vector, periodic manual alignment, use of magnetic sensors for attitude and heading correction, the use of physical constraints imposed by the building to reduce the error bounds).

In some preferred embodiments, the tracking system incorporates error reduction adjustments at many points along the data-processing path (e.g., in the raw accelerometer and gyroscope signal paths, to the orientation of the computational frame, to the gravity vector subtracted from the accelerometer measurements, to the computational-to-user coordinate transformation matrix, etc.).

In preferred embodiments, the processor 230 adjusts accelerometer 110 measurements with calibration factors determined at time of manufacture. In preferred embodiments of the tracking device 100, the accelerometer calibration factors correct for offset, scale, and misalignment errors in the accelerometer measurements.

In other preferred embodiments, the processor 230 adjusts gyroscope 130 roll-rate measurements with calibration factors determined at time of manufacture. In preferred embodiments, the gyroscope calibration factors correct for offset, scale, misalignment, and acceleration-response errors in the gyroscope measurements. Acceleration-response errors are changes in the gyroscope output due to applied acceleration even in the absence of any true rotation.

In further preferred embodiments, manufacturing calibration of a tracking device 100 uniquely characterizes the sensor errors for each tracking device and then generates an appropriate set of calibration factors for each particular tracking device. In such embodiments, these unique calibration factors are stored at manufacture in a non-volatile memory 270. In preferred embodiments, sensor calibration factors are applied to the raw sensor measurements using a matrix multiplication. In further embodiments, the manufacturing calibration procedure evaluates sensor error at more than one ambient temperature. Additional temperature-compensation factors are then stored in non-volatile memory 270 during manufacturing.

In preferred embodiments, periodic contact with or movement of a tracking device 100 through a homing field 310 allows the tracking system to update the computational frame of reference, the transformational matrix between the computational frame of reference and the user frame of reference, or both.

In preferred embodiments, the processor 230 or network communication network server 320 is configured to compensate error caused by the Earth's rotation as measured by the gyroscopes 130 for a given latitude. In preferred embodiments, the tracking system applies the corrections directly to the gyroscope 220 outputs, periodically updates the orientation of the computational frame of reference and updates the transformation matrix between the computation frame of reference and the user frame of reference.

Figure 6:
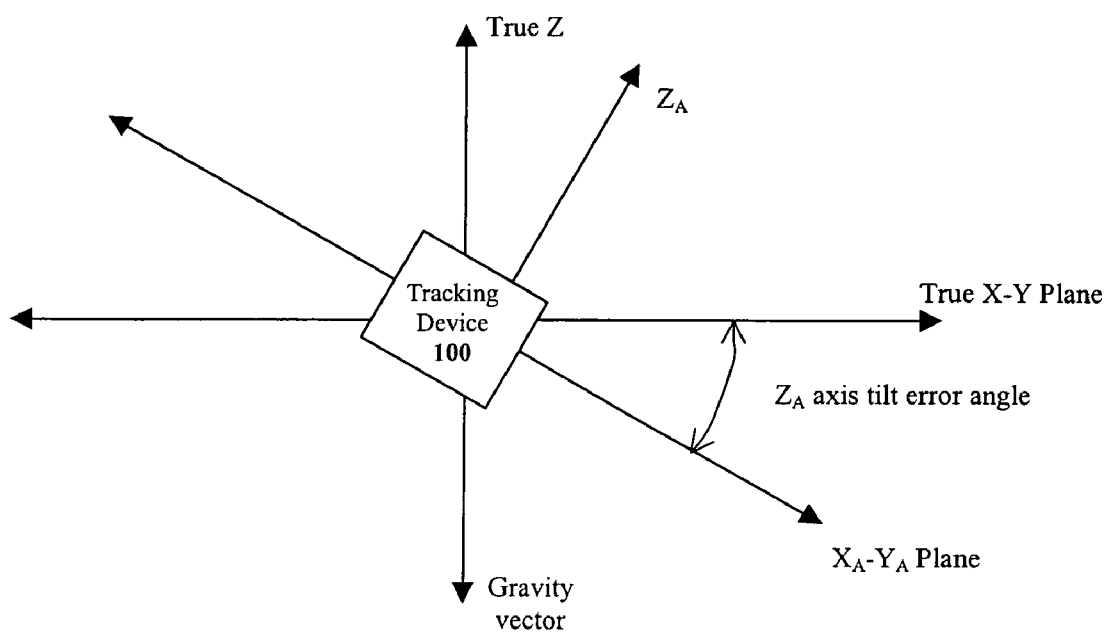
FIG. 6 depicts the presence of gravity and the constant 1g downward force in relation to the tracking device's computation frame of reference.

Accurate tracking of the tracking device 100 requires alignment of the computational frame of reference with the user frame of reference. In preferred embodiments, the accelerometers 200 are used to measure the presence of gravity and apparent 1-g acceleration. In such embodiments, the processor 230 determines the direction of gravity relative to the tracking device's computational frame of reference. The processor 230 periodically makes small rotational corrections to the computational reference frame in order to keep the vertical axis (e.g., the z-axis) of the computational frame aligned with gravity. FIG. 6 depicts the presence of gravity and the constant 1-g force in relation to the tracking device's computational frame of reference.

In further preferred embodiments, the processor 230 makes adjustments to the attitude quaternion and to the asset-location coordinates within the computational frame of reference.

In preferred embodiments, the asset is periodically placed in manual alignment fixture 130. The manual alignment fixture 130 is positioned by the user to assure the tracking device 100 is level and held in alignment with the user coordinate system (e.g., such as a user-defined coordinate system or the geographic north-south, east-west system of coordinates). Once the tracking device 100 is placed in the manual alignment fixture 130, an alignment command is issued to the tracking device 100 via wireless communication. The alignment command directs the tracking device 100 that the tracking device body axes are aligned with the axes of the user's coordinate system. Such an alignment process eliminates tilt in the $z_C$ axis and furthermore directs the tracking device 100 that the x and y body axes are aligned with the x and y axes of the user's coordinate system. Such an alignment process eliminates heading error that has accumulated. In some embodiments, the processor 230 resets the orientation of its computational frame of reference to the tracking device body axes, resets the attitude quaternion to zero rotation about all axes when in the alignment fixture. Additionally, the alignment process resets the origin of the user's coordinate system for that particular tracking device.

In preferred embodiments, the tracking device 100 corrects heading error through use of magnetic sensors 220. Heading error is not effectively reduced by periodic alignment to the gravity vector. In preferred embodiments, the magnetic field sensors 220 measure the ambient magnetic field vector of either the Earth or a homing station 110, in body axes coordinates. After the processor 230 rotates the magnetic vector into the computational frame of reference for attitude quaternion, the component of magnetic field in the computational x-y plane indicates the "north" direction when measuring the Earth's field and some installation-dependent direction when measuring a homing field 310.

Figure 7:
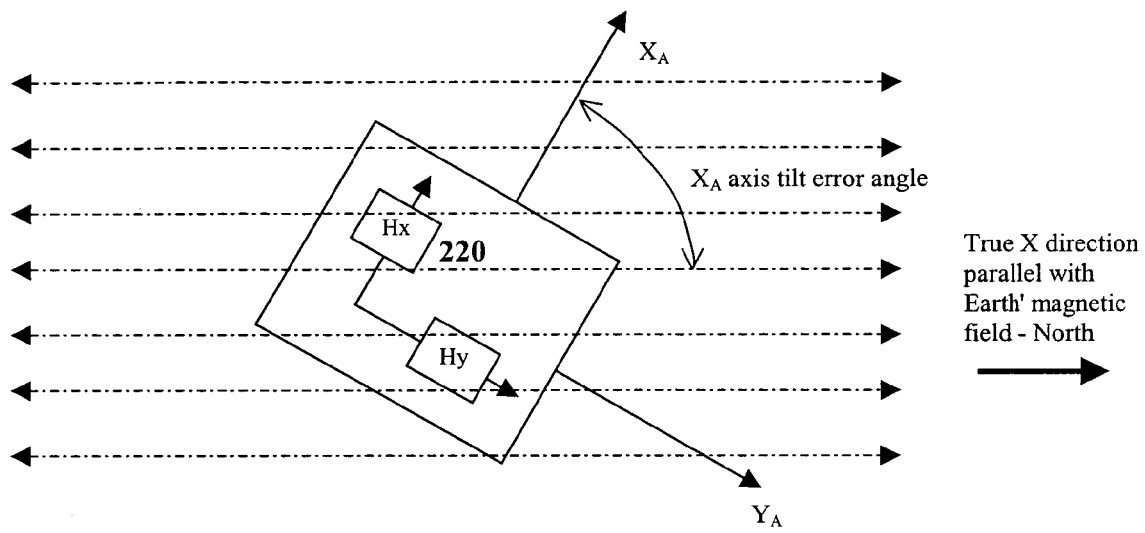
FIG. 7 depicts the presence of a magnetic field in relation to the tracking device's computational frame of reference.

In some preferred embodiments, the x-y axis of the computational reference frame is required to maintain a fixed relationship to the magnetic direction vector (e.g., the y-axis is required to always point north). In such embodiments, the processor 230 calculates the difference between the computational frame of reference and the magnetic field vector. The processor calculates the angular error between the computational frame of reference and the magnetic field vector through application of the following equation:

$$\text{Error\_angle} = \arctan\left(\frac{Hyh}{Hxh}\right);$$

wherein Hyh represents the y-component of the magnetic field measurements transformed to the horizontal plane and Hxh represents the x-component of the magnetic field measurements transformed to the horizontal plane. The transformation to the horizontal plane is accomplished with the following equations:

$Hxh=Xh*\cos(\theta x)+Yh*\sin(\theta y)*\sin(\theta x)-Zh*\cos(\theta y)$
$\sin(\theta x)$ and $Hyh=Y*\cos(\theta y)+Z*\sin(\theta y)$ $Hxh=Xh\cos\theta y\cos\theta z+Yh(-\cos\theta x\sin\theta z+\sin\theta x\sin\theta y\cos\theta z+Zh(\sin\theta x\sin\theta z+\cos\theta x\sin\theta y\cos\theta z)$ and $Hyh=Xh\cos\theta y\sin\theta z+Yh(\cos\theta x\cos\theta z+\sin\theta x\sin\theta y\sin\theta z)+Zh(-\sin\theta x\cos\theta z+\cos\theta x\sin\theta y\sin\theta z)$ where Xh, Yh and Zh are the outputs of the three orthogonal magnetic sensors, $\theta x$ is the roll angle of the tracking device relative to the XA axis, $\theta y$ is the pitch angle of the tracking device relative to the YA axis, and $\theta z$ is the heading or yaw angle relative to the ZA axis (see FIG. 4). In further preferred embodiments, the processor 230 aligns the tracking device 100 frame of reference with the magnetic field frame of reference prior to calculating the position of the tracking device 100. FIG. 7 depicts the presence of a magnetic field in relation to the tracking device frame of reference for the case where the tracking device is constrained to translational motion and yaw. The system of FIG. 7 can be extended to tracking devices that are free to roll around the X, Y, and Z axis by the addition of a third magnetic sensor orthogonal to the X and Y sensors.

As a tracking device 100 measures and computes the motion of an asset through space, the spatial error in the position that the tracking system reports for a particular asset increases over time.

In preferred embodiments, the communication network server 320 maintains a database of physical building constraints (e.g., walls, doorways, stairs, elevator shafts, etc.) in communication network server memory 330. The communication network server database is not limited to a particular type of database to represent the structural constraints (e.g., it may represent floor plans or a full three-dimensional model).

As the communication network server 320 receives asset location updates from the tracking devices, the communication network server evaluates the likelihood of the reported asset path or trajectory. In preferred embodiments, the communication network server 320 recognizes statistically unlikely paths (e.g., the majority of a tracking device's error bubble is very unlikely to pass through a wall). The communication network server 320 computes and applies corrections to the computational-to-user transformation matrix that results in a statistically likely path. In further preferred embodiments, certain constraints (e.g., a door or other small opening) can allow a reduction in the error bubble radius itself in addition to reducing the reported error. In some embodiments of the invention, the processor 230 is partially or wholly responsible for applying physical constraints and the resulting error-reduction adjustments to the asset location.

II. Uses of Tracking Systems

The present invention is not limited to a particular tracking use. In preferred embodiments, tracking includes, but is not limited to, the locating and monitoring of an asset. The present invention is not limited to use within a particular location. In preferred embodiments, the tracking device is applicable in an outdoor setting (e.g., a forest, a mountain, a roof top), an indoor setting (e.g., a warehouse, a hospital, an apartment building, an office building, a skyscraper), an underground setting (e.g., a cave, within snow), and an underwater setting. The tracking device is not limited to use with a particular type of asset. In preferred embodiments, the tracking device may be used with a broad range of assets, including, but not limited to, human beings, animals, and non-living entities (e.g., office furniture, wheel chairs, hospital equipment).

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. An asset tracking system, comprising:
   a) at least one tracking device associated with an asset, wherein said at least one tracking device measures acceleration and roll rate, identifies and mitigates measurement error, and determines asset position; and
   b) a communication network configured to receive said asset position from said at least one tracking device.

2. The asset tracking system of claim 1, wherein said communication network displays said asset position.

3. The asset tracking system of claim 1, wherein said asset is a non-living entity.

4. The asset tracking system of claim 1, wherein said asset is a living entity.

5. The asset tracking system of claim 1, wherein at least one tracking device measures acceleration with at least one accelerometer.

6. The asset tracking system of claim 5, wherein said accelerometer measures linear acceleration.

7. The asset tracking system of claim 1, wherein at least one tracking device measures roll rate with at least one gyroscope.

8. The asset tracking system of claim 7, wherein said gyroscope measures roll rate.

9. The asset tracking system of claim 1, wherein said measurement error is selected from the group consisting of: accelerometer measurement error, gyroscope measurement error, accelerometer linearity error, gyroscope linearity error, accelerometer noise, gyroscope noise, accelerometer drift, gyroscope drift, accelerometer misalignment, and gyroscope misalignment.

10. The asset tracking system of claim 1, wherein said at least one tracking device further comprises a processor.

11. The asset tracking system of claim 10, wherein said processor performs calculations to determine the location of said at least one tracking device.

12. The asset tracking system of claim 10, wherein said processor identifies accelerometer measurement error.

13. The asset tracking system of claim 10, wherein said processor identifies gyroscope measurement error.

14. The asset tracking system of claim 1, wherein the tracking device further comprises at least one magnetic sensor.

15. The asset tracking system of claim 14, wherein said at least one magnetic sensor measures the difference between the tracking device computational frame of reference and Earth's magnetic field.

16. The asset tracking system of claim 1, further comprising a homing station, wherein said homing station provides a homing station reference position for said at least one tracking device.

17. The asset tracking system of claim 16, wherein said asset position is in reference to said homing station reference position.

18. An asset tracking system, comprising:
   a) at least one tracking device associated with an asset, wherein said at least one tracking device comprises at least one accelerometer, at least one gyroscope, and a processor, wherein said at least one accelerometer measures linear acceleration, wherein said at least one gyroscope measures roll rate, wherein said processor identifies and mitigates accelerometer measurement error and gyroscope measurement error, wherein said processor determines asset position; and b) a communication network configured to receive said asset position from said at least one tracking device, wherein said communication network displays said asset position.

19. A method of tracking an asset, comprising:
a) providing an asset tracking system comprising:
   i) at least one tracking device associated with an asset, wherein said at least one tracking device measures acceleration, identifies and mitigates measurement error, and determines asset position; and
   ii) a communication network configured to receive said asset position from said at least one tracking device; and
b) acquiring said asset position for each asset
c) mitigating said measurement errors associated with said linear acceleration and roll rate measurements, and
d) determining the position of said asset in relation to said initial reference position.

20. The method of claim 19, wherein said communication network displays said asset position.

21. The method of claim 19, wherein said asset is a non-living entity.

22. The method of claim 19, wherein said asset is a living entity.

23. The method of claim 19, wherein said at least one accelerometer tracking device measures linear acceleration.

24. The method of claim 19, wherein said at least one gyroscope measures roll rate.

25. The method of claim 19, wherein said measurement error is inaccurate acceleration measurement.

26. The method of claim 19, wherein said at least one tracking device further comprises at least one magnetic sensor, wherein said at least one magnetic sensor identifies alignment errors with said at least one accelerometer and said at least one gyroscope.

27. The method of claim 19, wherein said at least one tracking device further comprises a processor, wherein said processor identifies and mitigates said measurement error.

28. The method of claim 19, further comprising a homing station, wherein said homing station provides a homing station reference position for said at least one tracking device.

29. The method of claim 28, wherein said asset position is in reference to said homing station reference position.

30. A method of tracking an asset, comprising:
a) providing an asset tracking system comprising:
   i) at least one tracking device associated with an asset, wherein said at least one tracking device measures acceleration; and
   ii) a communication network configured to receive measurements from said at least one tracking device, identify and mitigate measurement error, and determine asset position for said at least one tracking device; and
b) acquiring said asset position for each asset.

31. The method of claim 30, wherein said communication network displays said asset position.

32. The method of claim 30, wherein said asset is a non-living entity.

33. The method of claim 30, wherein said asset is a living entity.

34. The method of claim 30, wherein said at least one accelerometer tracking device measures linear acceleration.

35. The method of claim 30, wherein said at least one gyroscope measures roll rate.

36. The method of claim 30, wherein said measurement error is inaccurate acceleration measurement.

37. The method of claim 30, wherein said at least one tracking device further comprises at least one magnetic sensor, wherein said at least one magnetic sensor identifies alignment errors with said at least one accelerometer and said at least one gyroscope.

38. The method of claim 30, wherein said at least one tracking device further comprises a processor, wherein said processor identifies and mitigates said measurement error.

39. The method of claim 30, further comprising a homing station, wherein said homing station provides a homing station reference position for said at least one tracking device.

40. The method of claim 39, wherein said asset position is in reference to said homing station reference position.

41. The method of claim 30, wherein said communication network comprises a remote processor.

42. The method of claim 41, wherein said remote processor determines said asset position for said at least one tracking device.

* * * * *